US009740543B1

(12) United States Patent
Savage et al.

(10) Patent No.: US 9,740,543 B1
(45) Date of Patent: Aug. 22, 2017

(54) MULTI-ENDPOINT METHOD IMPLEMENTATION

(71) Applicant: Red Hat, Inc., Raleigh, NC (US)

(72) Inventors: Peter Victor Savage, Farnborough (GB); Ronny Pfannschmidt, Grasbrunn (DE); Milan Falesnik, Brno (CZ); Jan Krocil, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 15/336,440

(22) Filed: Oct. 27, 2016

(51) Int. Cl.
*G06F 9/54* (2006.01)

(52) U.S. Cl.
CPC .................................. *G06F 9/546* (2013.01)

(58) Field of Classification Search
None
See application file for complete search history.

(56) References Cited

U.S. PATENT DOCUMENTS

| | | | |
|---|---|---|---|
| 7,644,334 B2 | 1/2010 | Hickman et al. | |
| 8,006,138 B2 | 8/2011 | Nir-Buchbinder et al. | |
| 8,547,974 B1 | 10/2013 | Guruswamy et al. | |
| 8,917,194 B2 | 12/2014 | Whitby-Strevens | |
| 8,997,055 B2 | 3/2015 | van Gogh et al. | |
| 9,009,292 B2 | 4/2015 | Ho | |
| 2011/0098963 A1 | 4/2011 | Mukkavilli | |
| 2014/0075242 A1* | 3/2014 | Dolinina | G06F 11/3672 714/27 |
| 2016/0048506 A1 | 2/2016 | Levi et al. | |
| 2016/0080493 A1* | 3/2016 | Roth | G06F 9/45529 709/203 |
| 2016/0301739 A1* | 10/2016 | Thompson | G06F 9/541 |

OTHER PUBLICATIONS

Testing Rest Endpoints Using Rest Assured by Kostis Kapelonis, Oct. 21, 2016; pp. 1-22.
A Context-Based Infrastructure for Smart Environments by Anind D. Dey, Gregory D. Abowd and Daniel Saber; Graphics, Visualization and Usability Center and College of Computing, Georgia Institute of Technology, Atlanta, GA, USA 30332-0280, pp. 1-15, 1999.

(Continued)

*Primary Examiner* — Syed Roni
(74) *Attorney, Agent, or Firm* — K&L Gates LLP

(57) ABSTRACT

Methods and systems for implementing multi-endpoint methods are disclosed. For example, an Application Programming Interface ("API") executing on a processor receives a first request to execute a first method. The API processes the first request with an active context including a list of implementations, the list including one or more implementations of a plurality of implementations respectively associated with a plurality of endpoints including a first endpoint and a first implementation. The API is determined to be executing in either a preferential mode or a strict mode. In preferential mode the API selects preferential implementation from the plurality of implementations. In strict mode, the API selects a selected implementation from the list of implementations. The API either selects the first implementation or a preferred implementation. The first request is then processed by either the first endpoint or another endpoint associated with the preferential implementation.

20 Claims, 8 Drawing Sheets

(56) References Cited

OTHER PUBLICATIONS

Testing Context-Sensitive Middleware-Based Software Applications by T. H. Tse, Stephen S. Yau, W. K. Chan, Heng Lu, and T. Y. Chen; Department of Computer Science The University of Hong Kong Pokfulam Road, Hong Kong; Computer Science & Engineering Department Arizona State University Tempe, AZ 85287, USA; School of Information Technology Swinburne University of Technology, Hawthorn 3122, Australia, 2004; pp. 1-10.

* cited by examiner

MULTI-ENDPOINT METHOD IMPLEMENTATION

BACKGROUND

The present disclosure generally relates to implementing methods on shared application programming interfaces (APIs) used to fulfill requests. A method call is generally a procedure associated with a message or request and an object in object-oriented programming. An object is made up of properties and methods, which govern the behaviors the object is capable of. Method calls are generally implementation-specific, bound to a particular object, allowing the object to interact with the outside world. In dynamic environments, there may be multiple, even dozens of endpoints or interfaces used to interact with the same API. The API may use various discrete methods implemented to process requests related to the various possible endpoints.

SUMMARY

The present disclosure provides a new and innovative system, methods and apparatus for implementing multi-endpoint methods in computer systems. In an example, the system includes an API executing on one or more processors that receives a first request to execute a first method. The system also includes a plurality of endpoints associated with a respective plurality of implementations, where the plurality of endpoints includes at least a first endpoint associated with a first implementation. The API processes the first request with an active context which includes a list of implementations, which in turn includes at least one implementation of the plurality of implementations. The API is determined to be executing in either a preferential mode or a strict mode, where the preferential mode allows the API to select a preferential implementation from the plurality of implementations to execute a particular method, and the strict mode requires that the API select a selected implementation from the list of implementations to execute the particular method.

Upon determining that the API is executing in strict mode, the API selects the first implementation as the selected implementation to execute the first method. Upon determining that the API is executing in preferential mode, the API executes the first method with a preferential implementation selected from the plurality of implementations. The first request is then processed by either the first endpoint or another endpoint associated with the preferential implementation.

Additional features and advantages of the disclosed method and apparatus are described in, and will be apparent from, the following Detailed Description and the Figures.

DETAILED DESCRIPTION OF EXAMPLE EMBODIMENTS

Figure 1:
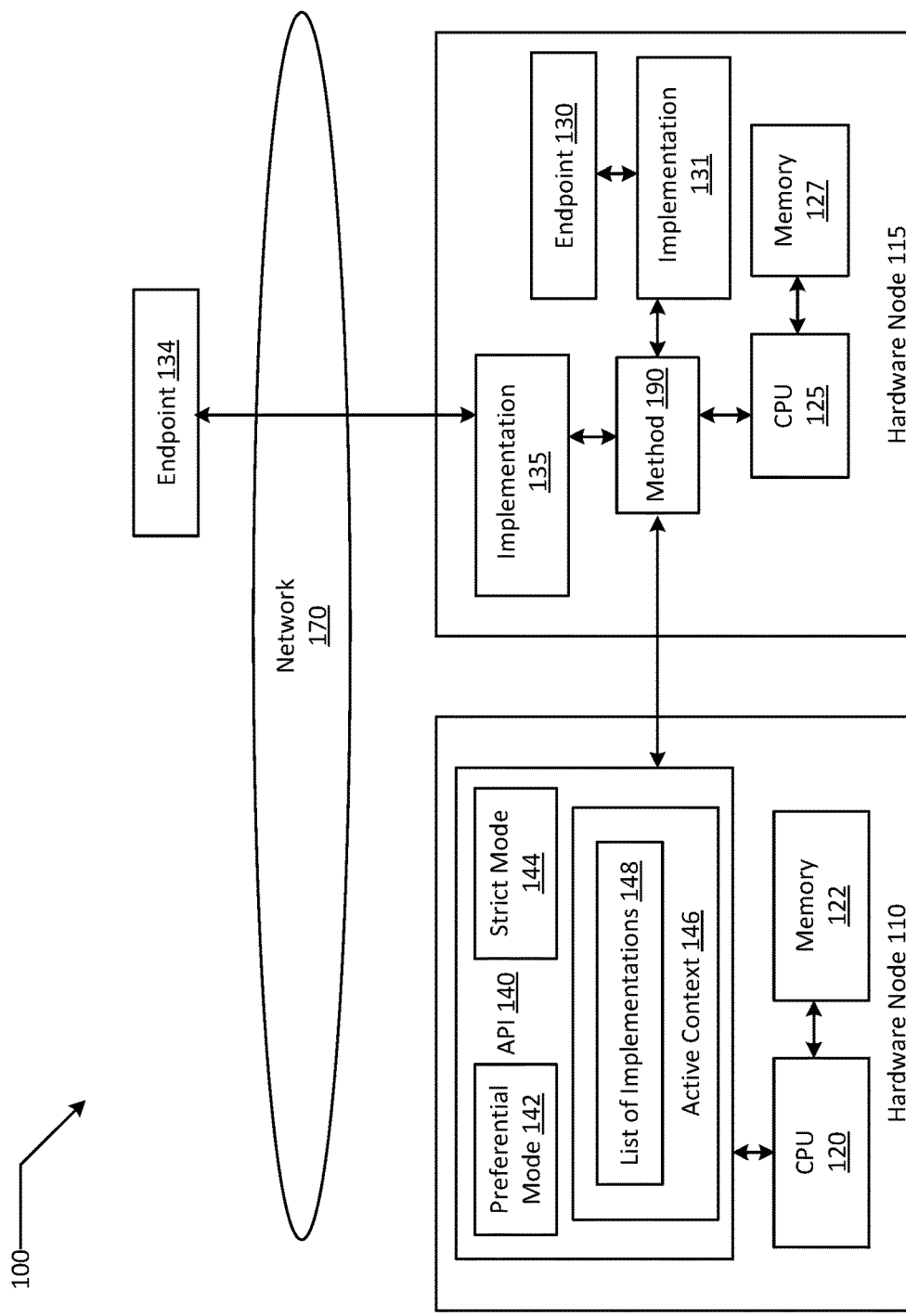
FIG. 1 is a block diagram of an example system illustrating implementing multi-endpoint methods according to an example of the present disclosure.

In computer systems, there are often many endpoints or interfaces used for interacting with the same system. To implement alternative endpoints for interacting with a system, for example, calling a method or function of the system, the system generally requires a customized solution to translate the core functionality into a format that the specific endpoint may utilize. In many embodiments, this type of translation is achieved by implementing bespoke alternative methods for each possible endpoint interfacing with the system. A pronounced disadvantage arises from needing to track and update all of these bespoke solutions in order to keep all of the alternative methods useful for each new release, including running bespoke test cases to test each method's functionality. As an example, a system may have a web service interface for browser requests, an alternative Representational State Transfer (REST) interface, a mobile app interface, a command line interface (e.g., implemented via Secure Socket Shell (SSH) protocol), a third party interface for affiliates to use, and a direct interface into the application database all to manipulate the same data, for example, a vote in a poll. A programmer needing to test each interface then needs to understand the particularities of each individual method implementation for casting a vote in the poll for each interface to implement test cases specific to each possible method implementation. A programmer wanting to introduce failover procedures to implement backup interfaces for their vote casting interface generally needs to also specifically implement a different method for each interface. A scalability problem arises in needing to create, test, track and keep updated an array of different methods performing analogous tasks towards the same goal. Multiple methods with separate names producing similar or identical functions become difficult to manage and use, even for one skilled and knowledgeable in the environment where the methods are implemented.

The present disclosure alleviates issues in both of these situations through the use of APIs that run in either a strict mode or a preferential mode with generic method names rather than implementation-specific method names. In an example, a programmer may use the same test program to test every endpoint for a system as the system would use the same method and method name for the same functionality regardless of endpoint or implementation. The programmer would then be able to specify a particular endpoint and/or implementation for the testing of each subcomponent if desired, allowing the API to route the test data and results properly. In another example, without knowing every possible implementation, a programmer may invoke a method generically, and the API may route a request to a working implementation without the programmer specifically requesting such an implementation or even necessarily knowing of the implementation, in which case, it would not be possible for the programmer to use an implementation-specific method name. In some examples, the API may even use an implementation that was not implemented or envisioned when the programmer first created the original implementation. Examples of the present disclosure therefore improve resiliency of computer systems while reducing overhead for testing, developing, maintaining and implementing new interfaces to such computer systems.

FIG. 1 depicts a block diagram of an example system illustrating implementing multi-endpoint methods according to an example of the present disclosure. In an example, hardware nodes 110 and 115 may host one or more physical processors (e.g., CPUs 120 and 125) communicatively coupled to respective memory devices (e.g., memory 122 and 127). As discussed herein, a memory device 122 or 127 refers to a volatile or non-volatile memory device, such as RAM, ROM, EEPROM, or any other device capable of storing data. As used herein, physical processor or processors (120 and 125) refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). Processors 120 and 125 may be interconnected using a variety of techniques, ranging from a point-to-point processor interconnect, to a system area network, such as an Ethernet-based network. In an example, hardware nodes 110 and 115 may be the same hardware node or may each represent a network of multiple hardware nodes providing the functionality specified for hardware nodes 110 and 115. In some embodiments, memory 122 and memory 127 may be the same memory. Likewise, CPUs 120 and 125 may also be the same processor in some embodiments.

In an example, API 140 may operate as a component of the hardware node 110 such as an executable program performing the functions of the API 140 in the present disclosure. For example, an executable program of the API 140 may be in a number of languages including ARM® architecture assembly, Atmel AVR assembly, x86 assembly, Freescale 68HC11 assembly, Freescale v4e assembly, Motorola 680x0 assembly, MIPS assembly, PowerPC® assembly, IBM® System z assembly, TI® MSP430 assembly, Zilog Z80 assembly, and machine code. API 140 may run on processors 120. Local connections within the API 140 including, for example, the connections between processor 120 and memory 132 may be provided by one or more local buses of suitable architecture, for example, peripheral component interconnect (PCI).

In an example, API 140 may execute in one of two modes, a preferential mode 142 and a strict mode 144. Executing in the preferential mode 142, for example, may allow the API 140 to execute method 190 with any implementation of a plurality of implementations (e.g. implementations 131 and 135). Executing in the strict mode 144, for example, may restrict the API 140 in executing method 190 to only implementations included in a list of implementations 148, located in an active context 146 of the API 140. In an example, the only implementation in the list of implementations 148 may be implementation 135. In an example, in addition to the list of implementations 148, the active context 146 may include other parameters used by the API 140 to decide on an implementation to utilize in executing method 190, for example account information to be passed on to a method or implementation. In an example, the active context 146 may include factors for determining a preferential implementation for API 140 executing in preferential mode 142, such factors including the speed of execution of different implementations, a programmed preference, information about the availability of different implementations, information tracking historical usage of different implementations, random distribution generators for distributing load, attributes associated with different methods, and other possible determining factors used by API 140 in selecting a preferential implementation. In an example, the active context 146 may also include information passed to the API 140 by a requestor requesting the execution of method 190, for example, information defining a requested list of implementations 148 with which to execute method 190, and/or information setting the mode (preferential mode 142 or strict mode 144) with which the API 140 should execute method 190. In some examples, the API 140 may be configured with a default list of many or even all possible combinations of methods and implementations in system 100. In an example, the API 140 may also be configured to discover new implementations for methods that interact with API 140. In some examples, the list of implementations 148 may default to a list of possible implementations for each method that API 140 provides an interface.

In an example, method 190 may be a procedure, function or routine associated with a request and an object, the object being made up of properties and methods affecting the properties of the object. In some examples, method 190 may be associated with a class. Method 190 may execute on CPU 125 in hardware node 115, or in alternative embodiments, method 190 may execute on CPU 120 on hardware node 110. A request passed from API 140 with elements of active context 146, such as, for example list of implementations 148 allows method 190 to be executed with an implementation of the plurality of implementations (e.g., implementations 131 and 135). Implementations 131 and 135 may in turn be associated with endpoints 130 and 134. In some examples endpoints 130 and 134 may be located across a network 170 from implementations 131 and 135. For example, the network 170 may be a public network (e.g., the Internet), a private network (e.g., a local area network (LAN) or wide area network (WAN)), or a combination thereof. In other examples, API 140, method 190, implementations 131 and 135, and endpoints 130 and 134 may all be located on one hardware node (e.g., hardware node 110) or some or all of these components may be separated from each other by network 170. In an example, endpoints 130 and 134 may be a web service interface for browser requests, an alternative REST interface, a mobile app interface, a command line interface, a direct interface into the application database, or any other interface with API 140 that may process a request to execute method 190. An endpoint of the system may be any entry point to the system that can trigger the system to perform an action yielding a returned result from the system. It is therefore possible for a first endpoint to use a second endpoint to generate the result, in such a case, the first endpoint may also be considered part of the implementation of the second endpoint. For example, a web form filled out by a user to create an account on a website may be an endpoint. The web form may collect information, then repackage the information into an Extensible Markup Language ("XML") format and send the information to a web service connected to API 140. At the same time, the web service may also be an endpoint that may be independently used as an XML interface directly without using the web form. In the example, the web form is both an implementation of the XML interface endpoint as well as an independently useable and testable endpoint.

Figure 2:
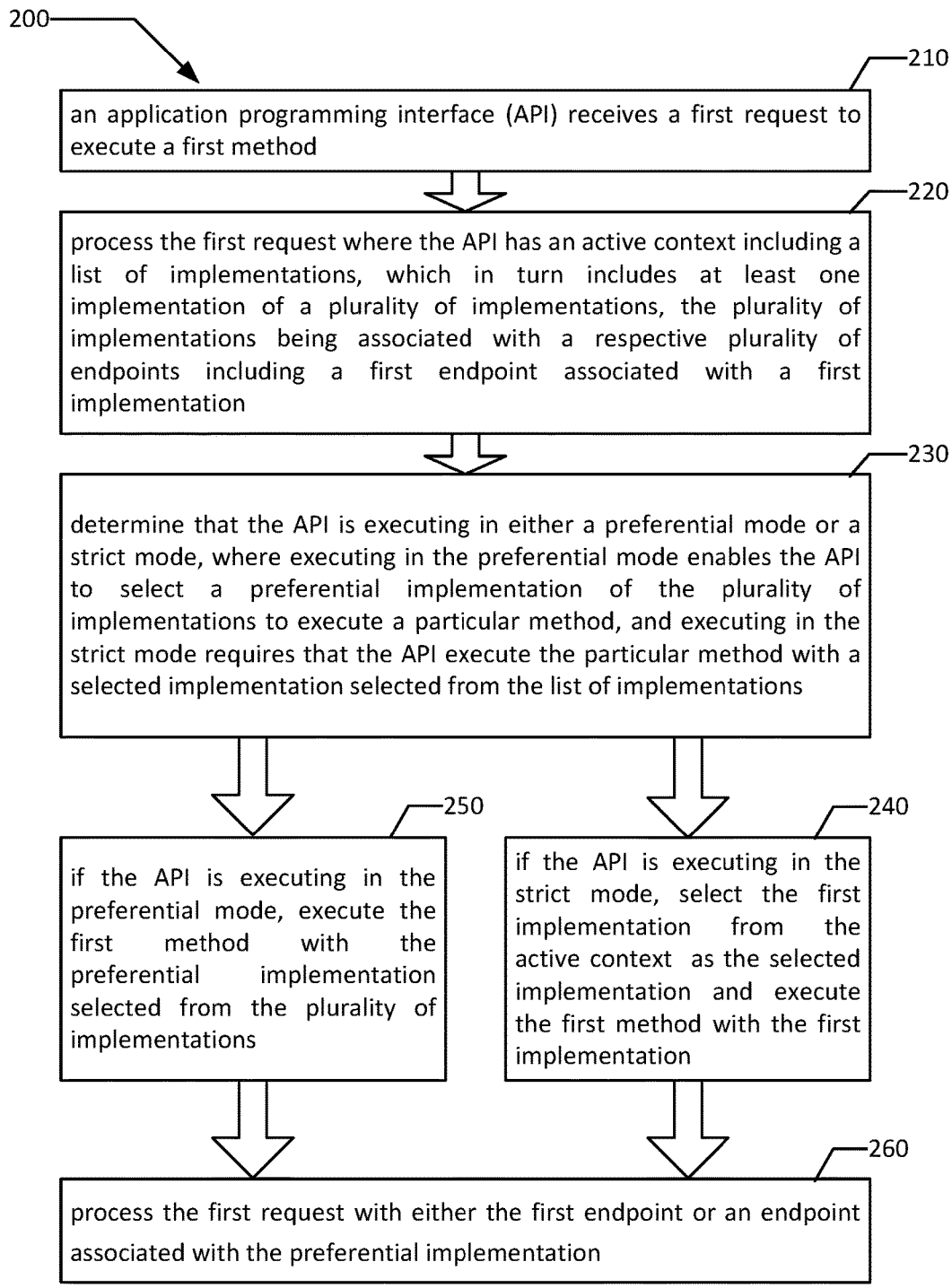
FIG. 2 is a flowchart illustrating an example of implementing multi-endpoint methods according to an example of the present disclosure.

FIG. 2 is a flowchart illustrating an example of implementing multi-endpoint methods according to an example of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, and some of the blocks described are optional. The method 200 may be performed by processing logic that may comprise hardware (circuitry, dedicated logic, etc.), software, or a combination of both. In an example, the example method 200 is performed by API 140.

An API receives a first request to execute a first method (block 210). For example, the API 140 may receive a request to execute method 190. A request may originate from a wide variety of sources. In an example, a test engineer may issue a request from a test interface capable of simulating any or all valid interfaces and/or endpoints for API 140. A test interface may also be able to invoke some or all of the functionality available to programs interfacing with API 140. Alternatively, for example, the request to API 140 may also be a request by a user through an interface to have system 100 perform a function. In some examples, a request may originate through an endpoint such as endpoints 130 and 134. In some examples, an endpoint may also be a user accessible interface. In some examples, an interface may be any system or component through which a request may be issued to API 140.

The API processes the first request, where the API has an active context including a list of implementations, which includes at least one implementation of a plurality of implementations, the plurality of implementations being associated with a respective plurality of endpoints including at least a first endpoint associated with a first implementation (block 220). In an example, API 140 may have an active context 146 with a list of implementations 148. In some examples, the active context 146 and the list of implementations 148 may be set and/or updated by the first request or information associated with the first request. An update to the active context 146 or the list of implementations 148 may change the settings of the active context 146 and the list of implementations 148 from a default state: until the next time settings of the active context 146 or the list of implementations 148 are updated, for example, by a later request; until a set number of methods and/or test cases have been run; or only for a single request to execute a particular method, for example method 190, before returning to the default state.

In an example, the first request may be a request to invoke a method "cast_vote" to cast a vote in a poll. In an example, implementation 135 may be an implementation of method cast_vote associated with endpoint 134, which may be a web user interface that can cast a vote in the system. In an example, the web user interface endpoint 134 is located over network 170. Another possible implementation of method cast_vote may be via a command line interface (possibly accessible by an administrator over SSH protocol), for example, implementation 131, where the command line interface is endpoint 130 located on the same hardware node 115 as method "cast_vote" 190. In an example, an implementation may provide a translation of a request to method 190, the request, for example, being to cast a yes vote on a first poll. In the example, implementation 135 may be a test utility that simulates a user clicking in a browser (e.g., endpoint 134) to click a yes vote for the first poll. Alternatively, implementation 135 may also bypass the graphical user interface of web user interface endpoint 134 and directly test the web service used by web user interface endpoint 134 to pass information to the system by directly submitting an XML form with sample data to the web service. In the example, implementation 131 may be a script (e.g., a shell script, PERL script etc.) that invokes a command line interface (e.g., endpoint 130) to cast a yes vote for the first poll. In a another example, an implementation could be a database driver or database script that induces a database storing the first poll to add a counter for a yes vote to the stored results of the first poll. In an example, the list of implementations 148 may be set by the first request and include zero implementations, one implementation, or a plurality of implementations up to and including every possible implementation of the method 190. In another example, the first request may be a request to process a payment for a financial transaction using one of multiple folios of payment (e.g., debit card, credit card, wire transfer, money order, check etc.), interfaces to payment systems corresponding to the forms of payment may then be the endpoints for the system. In a third example, the first request may be a request to cast a vote in a poll from a mobile phone, the mobile phone capable of interacting with the server hosting the poll in multiple ways, for example, through a mobile webpage, a desktop webpage, a webpage formatted for tablet devices, and a dedicated mobile application.

It is determined that the API is executing in either a preferential mode or a strict mode, where executing in the preferential mode enables the API to select a preferential implementation of the plurality of implementations to execute a particular method, and executing in the strict mode requires that the API execute the particular method with a selected implementation selected from the list of implementations (block 230). In an example, API 140 may execute the first request in either the preferential mode 142 or the strict mode 144. The mode of the execution for the first request may be set by the first request, the mode may also be preset for a series of requests, or in some examples where no instructions are given as to the mode the API should execute in, the preferential mode may be selected by the API 140. In some examples, the failure to set a mode by a request may result in the API 140 executing in preferential mode 142, possibly with a default list of implementations. In an example, the default list of implementations may include all possible combinations of methods and implementations. In another example, where the list of implementations 148 in the active context 146 includes no valid implementations for method 190 and the API 140 is executing in strict mode 144, the API 140 may return an error. In another example where the list of implementations 148 in the active context 146 includes no valid implementations for method 190 and the API 140 is executing in strict mode 144, the API 140 may switch to executing in preferential mode 142 and then execute the method 190 with a valid preferential implementation. In an example, a programmer may choose to test the method 190 by executing cast_vote strictly using a simulation of the web interface 134, perhaps even repeatedly, to test the robustness of the web interface 134, causing the API 140 to execute with one option (web implementation 135) in the list of implementations 148, in strict mode 144. In another example, a payer may request to pay via credit or debit card over other available options due to convenience, or due to transaction costs, causing the API to execute in strict mode with two implementations (credit card and debit card) in the list of implementations. In another example, a user of a mobile phone may simply request that a vote be cast, and the system may use any implementation in preferential mode, choosing to use the dedicated mobile application as its preferred implementation of casting the vote and displaying results.

In an example, API 140 will be configured with up to date information regarding substantially all of the valid method-implementation combinations in system 100. In an example, API 140 and/or active context 146 may be preconfigured with information regarding interfacing with many or all of the method-implementation combinations available for execution by API 140 in the system. In another example, the various implementations in the system may announce to API 140 the methods supported by the various implementations. In an example, a programmer may first deploy a new method to the system. Various programmers responsible for implementations and endpoints in the system may then develop implementations to allow the new method to interface with a particular endpoint. In an example, a programmer developing a first implementation for a first endpoint does not need to know of the existence of any other implementation or endpoint. In an example, as part of releasing a new implementation to the system, a programmer may update the API 140 and/or the active context 146 with the existence of the new implementation and any implementation specific requirements necessary to use the new implementation. In an example, a financial payment system may require a credit card number, expiration date and security code for one implementation for a credit card payment system endpoint and a bank account number and routing number for another implementation for a wire transfer system endpoint.

An API determined to be executing in the strict mode selects the first implementation as the selected implementation from the list of implementations in the active context and executes the first method with the selected first implementation (block 240). In an example, the API 140 may be determined to be executing in strict mode 144, and may select implementation 135 from list of implementations 148 in active context 146 to execute method 190. In an example, implementation 135 may be a utility that simulates mouse clicks and keyboard strokes used by a programmer to validate that a web service and web based UI for casting a vote is functioning properly. In a further example, upon receiving a second request to execute the first method, the API 140 may execute method 190 with implementation 131, provided that implementation 131 is included in an updated list of implementations 148 for the second request executing in strict mode 144. Alternatively, the API 140 may select either implementation 131 or implementation 135 to execute a third request to execute a different method if both implementations 131 and 135 are included in a list of implementations updated for the third request or a separate list of implementations associated with the different method. In some examples, a list of implementations 148 may be associated with a particular method, with different methods being associated with different lists of implementations. In an example the different lists of implementations may be updated in response to requests to execute the respective methods the lists of implementations are associated with. In an example, a request to execute one method may update the list of implementations for multiple methods, especially in cases where the requested method may invoke other methods. In some examples a first method 190 may invoke a second method. The second method may be, for example, a method to show vote results. There may be different parameters and a different list of implementations associated with the second method in the active context 146 than the parameters and list of implementations 148 associated with the first method 190. In an example, the request to execute the first method 190 may update the active context 146 in relation to parameters utilized by the second method and a list of implementations associated with the second method. In some examples, the second method may be executed in the same mode as the first method 190; in other examples, the API 140 may be configured to execute the second method in a different mode from the first method 190. In another example, a payer may choose to use either a credit card or a debit card to pay for a transaction, both options being included in the list of implementations and selectable by the API acting in strict mode, but a third wire transfer payment option may be excluded.

An API determined to be executing in the preferential mode executes the first method with a preferential implementation, the preferential implementation being selected from the plurality of implementations (block 250). In an example, the API 140 may be requested to test that the system 100 is functioning properly and that a result may be returned in response to the first request. In the example, the active context 146 may be configured to prioritize the fastest or most reliable implementation available for method 190, for example, command line interface implementation 131 may be deemed more reliable than web interface 135, and the API 140 may select to execute method 190 with command line interface implementation 131. In some examples, executing in preferential mode 142, the API 140 may select an implementation not included in list of implementations 148, for example, a third implementation to directly update the voting database. In some examples, the list of implementations 148 may be used by the API 140 executing in preferential mode 142 to prioritize which implementation to select for executing method 190, an implementation prioritized via being present in the list of implementations 148 may be selected as the preferential implementation. API 140 may also execute method 190 with a different implementation if its initial preferential implementation fails, in some examples, the API 140 may then notify the requestor of both a failure of one or more implementations and a successful result. In some examples, the API 140 may prioritize different implementations to select a preferential implementation based on the list of implementations 148, attributes associated with the first method 190, a preference list in the active context 146 or the API 140, information regarding the availability of different respective implementations (i.e., data that certain implementations are currently down for maintenance), historical usage, and a random distribution. In some embodiments, a request to execute method 190 executed by the API 140 in preferential mode 142 may succeed where a similar request to execute method 190 executed in strict mode 144 would fail. In an example, the preferential mode 142 may select a preferential implementation not available in the list of implementations 148 for the strict mode 144 to select, and all of the options in the list of implementations 148 may fail. In an example, a mobile phone user casting a vote in a poll may cast a vote using a mobile browser based user interface, and the API receiving the vote may execute the voting using a desktop browser based user interface because lower current desktop traffic allows the desktop interface to be faster, or the API may execute the request with a dedicated mobile application interface because the web service server may be currently unresponsive.

Upon selecting a preferential or selected implementation, the first request may be processed with either the first endpoint associated with the selected implementation or an endpoint associated with the preferential implementation (block 260). In an example, the API 140 may process the first request with one of the first endpoint (e.g., endpoint 130) and an endpoint (e.g., endpoint 134) associated with the preferential implementation (e.g., implementation 135). In an example, the first endpoint 130 may be tested by simulating clicking through a browser based interface to cast a vote. In another example, the API may pay for a financial transaction with a credit card, sending payment information through a credit card company's web interface. In another example, a web service UI may send an html request to cast a vote.

Figure 3A:
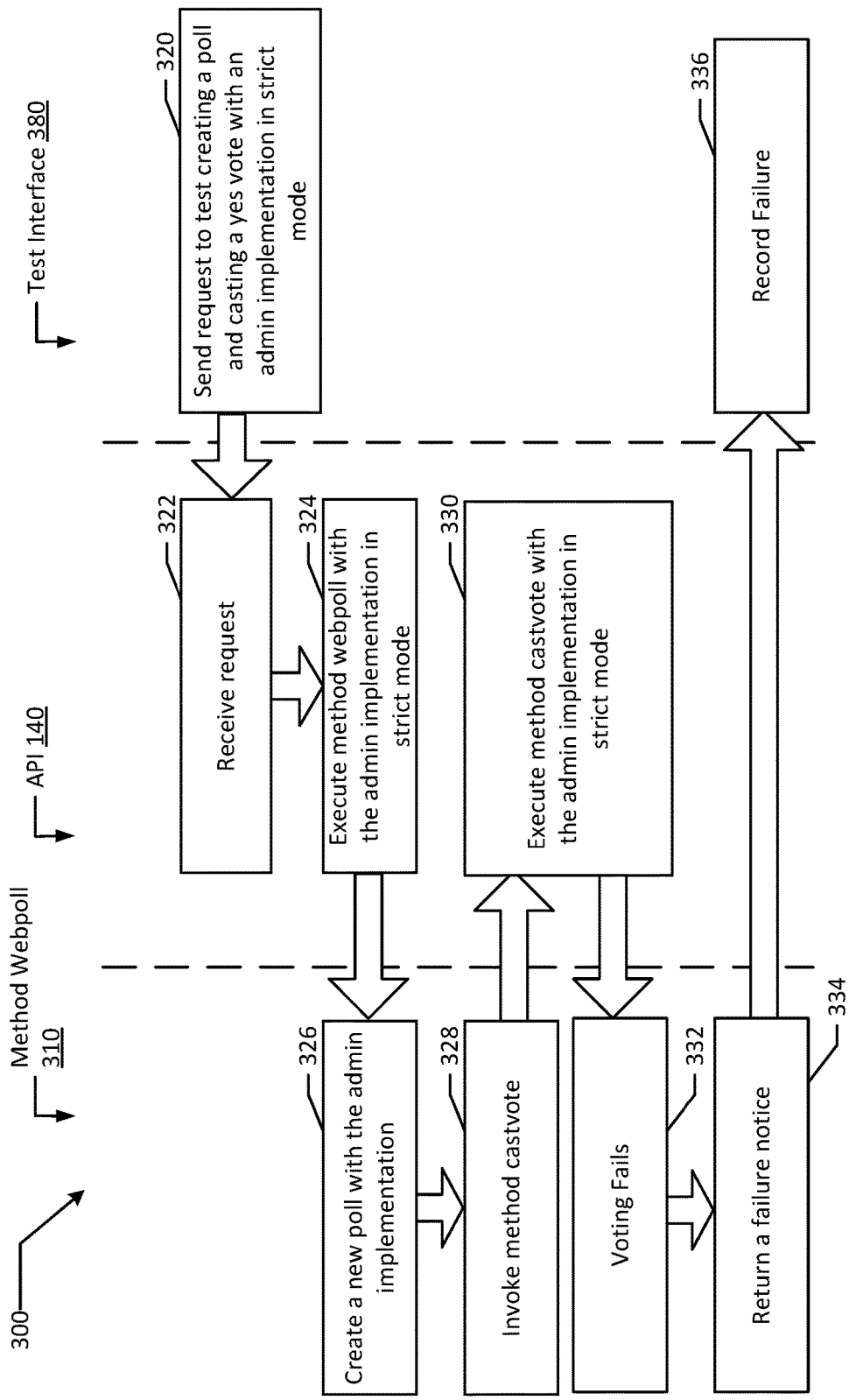
FIG. 3a, FIG. 3b and FIG. 3c are flowcharts illustrating examples of implementing multi-endpoint methods in a testing environment according to an example of the present disclosure.
Figure 3B:
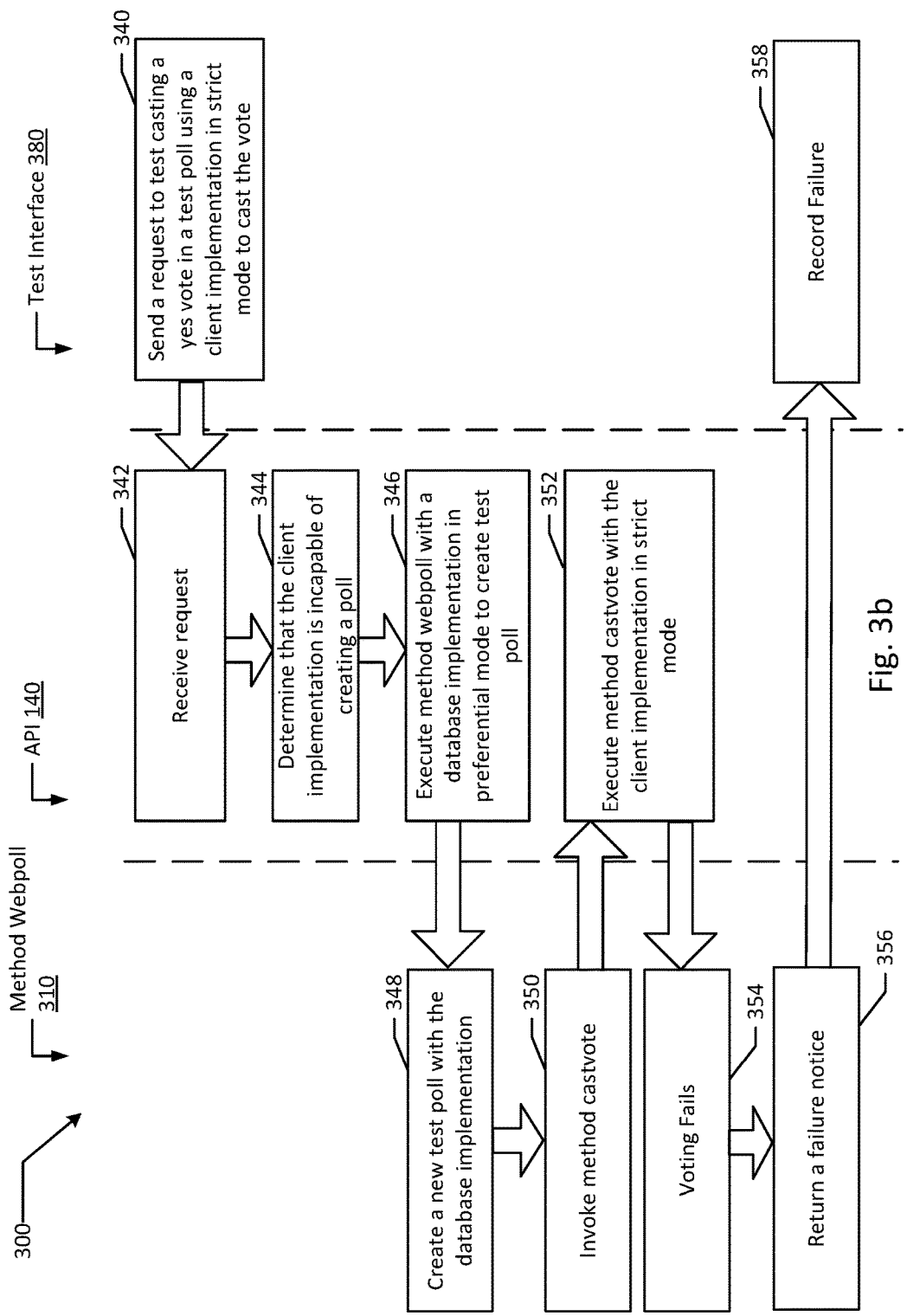
Figure 3C:
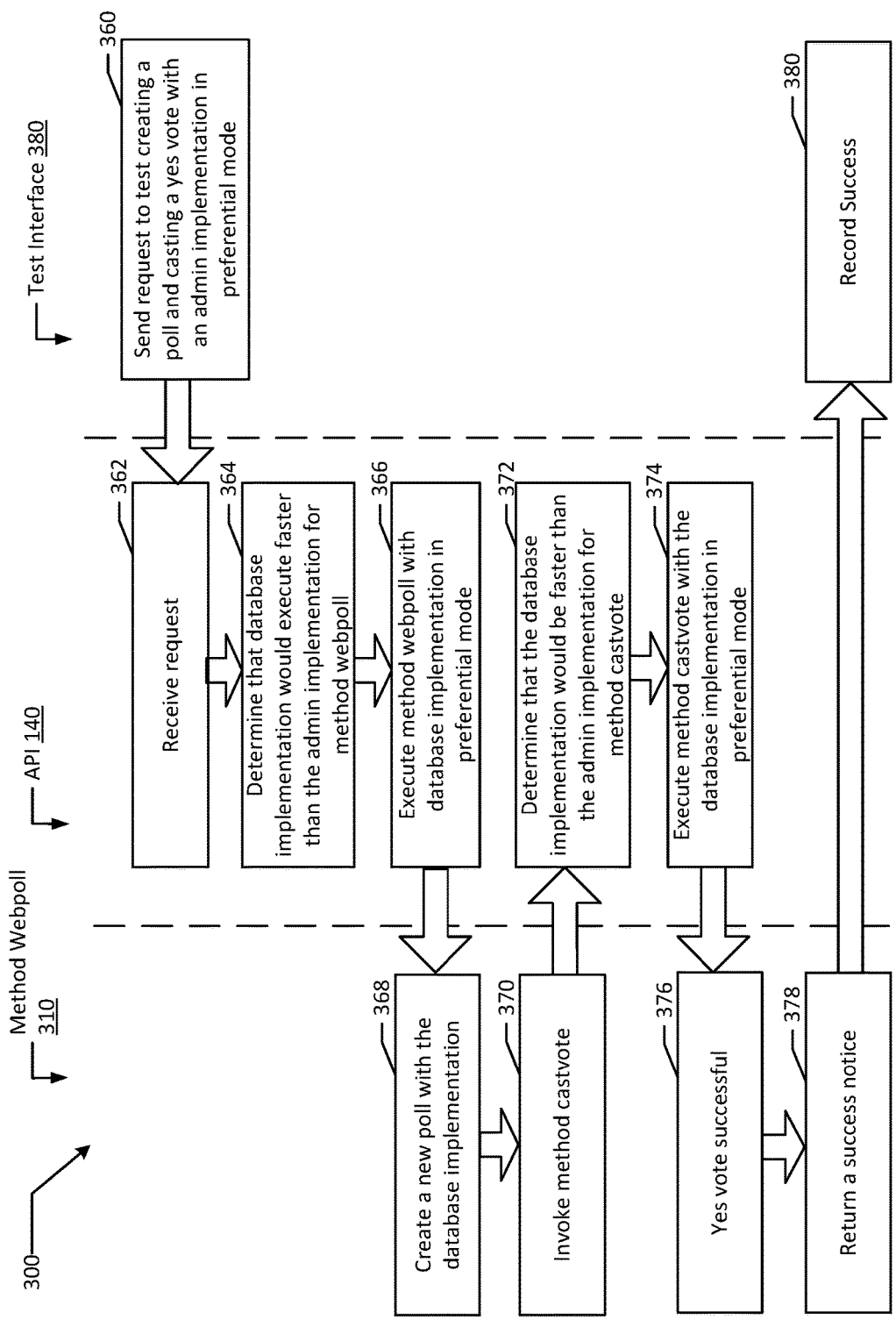

FIG. 3*a*, FIG. 3*b* and FIG. 3*c* illustrate flowcharts illustrating examples of implementing multi-endpoint methods in a testing environment according to an example of the present disclosure. Although the examples below are described with reference to the flowcharts illustrated in FIG. 3*a*, FIG. 3*b* and FIG. 3*c* it will be appreciated that many other methods of performing the acts associated with FIG. 3*a*, FIG. 3*b* and FIG. 3*c* may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both.

In the example method 300, a test interface 380 issues a request in various different manners to API 140 to execute a method webpoll 310. A test may be constructed to strictly test whether creating a poll and casting a vote with an admin implementation associated with an administrator web interface is functioning properly. For example, the test interface 380 sends a request to test creating a poll and casting a yes vote, setting the list of implementations 148 to include only an admin implementation and setting the API 140 to execute in strict mode 144 (block 320). API 140 receives the request (block 322). API 140, determined to be in strict mode 144 with only one choice in the list of implementations 148 executes method webpoll 310 with the admin implementation (block 324). Method webpoll 310 receives the request to create a new poll with the admin implementation (block 326). In an example, as part of executing method webpoll 310, a second method castvote is invoked by method webpoll 310 to cast a vote (block 328). The API 140, with information from the active context 146, including the list of implementations 148 set to only include the admin implementation, selects the admin implementation to execute method castvote (block 330). In such an example, the API 140 may execute a first method 190 and a second method in the same mode. In an example, execution in the same mode may not necessarily mean execution with the same implementation.

In an example, the admin implementation for method castvote is not functioning properly, and a result of a failed vote is returned to method webpoll (block 332). In an example, method webpoll 310 may return a failure notice for method webpoll 310 (due to the failure of sub-method castvote) to test interface 380 (block 334). In an alternative example, method webpoll 310 may return a successful message for method webpoll 310 (for the successful poll creation) with a partial failure for failing to execute castvote either directly to test interface 380 or routed through API 140. In an example, test interface 380 may record the results of the failure (block 336). In another example, the test may succeed with a success returned to test interface 380.

As illustrated in FIG. 3*b*, a test may be conducted to see whether casting votes in a pre-created poll using a client implementation associated with a client web interface is functioning correctly, the client interface lacking an implementation to create a poll. A test interface 380 may send a request to test casting a vote using a client implementation with the API 140 executing in strict mode 144 (block 340). The API 140 may receive the request (block 342). Upon receiving the request, the API 140 may determine that a poll does not yet exist to test, and that the client implementation is incapable of creating a poll (block 344). In some examples, the API 140 may reject the request from the test interface due to the impossibility of creating a poll in strict mode 144 using the client implementation. In other examples, the API 140 may execute method webpoll in preferential mode 142 to create a poll with which to test casting a vote with the client implementation, and using the active context 146, the API 140 may select a database implementation updating the voting database directly to create a test poll (block 346). The API 140 may execute method webpoll 310 with a database implementation to successfully create a new poll (block 348). Method webpoll 310 may invoke method castvote to test voting in the new poll (block 350). Receiving a request to execute method castvote, API 140 may determine that there is an outstanding request to test casting a vote in a test poll with the client implementation in strict mode 144 (block 352). In such an example, the API 140 may execute a first method with a different mode and implementation than a second method, for example the API may execute method webpoll 310 in preferential mode 142 with a database implementation and method castvote in strict mode with a client implementation. In an example, the webserver hosting the client implementation of method castvote may be malfunctioning, resulting in API 140 reporting to method webpoll 310 and/or test interface 380 that method castvote executed with the client implementation failed (block 354). In an example, method webpoll 310 may return a failure notice for method webpoll 310 (due to the failure of sub-method castvote) to test interface 380 (block 356). In an alternative example, method webpoll 310 may return a successful message for method webpoll 310 (for the successful poll creation) with a partial failure for failing to execute castvote either directly to test interface 380 or routed through API 140. In an example, test interface 380 may record the results of the failure (block 358). In another example, the test may succeed with a success returned to test interface 380.

As illustrated in FIG. 3*c*, a programmer may request that a test may be run for casting a vote in preferential mode 142, for example, to verify if any implementation of method 310 webpoll and method castvote will produce a successful result. In the example, test interface 380 sends a request to test creating a poll and casting a yes vote to API 140 with the preferential mode 142, including a request to place an admin implementation in the list of implementations 148 (block 360). The API 140 receives the request (block 362). In an example, the API 140 will be configured with the capability of interfacing with any valid method-implementation combination in the system. Although the only member of the list of implementations 148 is the admin implementation, the API 140 executing in preferential mode 142 may select to use another implementation of the plurality of implementations in the system, for example, a database implementation, based on historical speed data, to directly create a test poll in the voting database (block 364). The API 140 may execute method webpoll 310 with the database implementation (block 366). Method webpoll 310 may successfully create a new poll with the database implementation (block 368). Method webpoll 310 may then invoke method castvote to test casting a vote (block 370). Although the only member of the list of implementations 148 is still the admin implementation, API 140 may determine that, because of current errors with the admin implementation of method castvote, or due to historical speed, the database implementation is more preferential than the admin implementation for executing method castvote (block 372). In the example, the API 140 decides to execute method castvote with the database implementation in preferential mode 142 (block 374). In an example, a successful vote result is returned to method webpoll 310 (block 376). Method webpoll 310 may then return a success report to test interface 380 (block 378). In an example, the success report may be routed via API 140 to the test interface 380. In an example, test interface 380 may record the results of the success (block 380).

In examples of the present disclosure for testing software, multiple methods may be invoked either directly through requests from a test interface 380, or indirectly from one method invoking another, for example, method webpoll 310 invoking method castvote. In some examples, certain methods may be executed by API 140 in preferential mode 142 and other methods may be executed by API 140 in strict mode 144, for example, in response to whether a programmer wishes to test a specific functionality of an implementation or endpoint. In an example, a system may exist with four endpoints, a REST interface, a web user interface (UI), a database, and a command line interface. In the example, the REST interface implementation supports three methods, create_poll, cast_vote, and read_vote; the web UI implementation supports two methods, cast_vote and read_vote; the command line interface implementation supports two methods, create_poll and delete_poll; and the database implementation supporting all four possible methods, create_poll, delete_poll, cast_vote, and read_vote. In an example test case, all four methods are required to complete a test cycle, create_poll to set up a poll to test, cast_vote to cast a test vote, read_vote to return a vote result to the programmer, and delete_poll to clean up the environment after running the test. A test interface 380 may send a request to execute create_poll with the API 140 set to preferential mode 142 with REST and database added to a list of implementations for create_poll, then execute cast_vote and read_vote with the API 140 set to strict mode 144 with the web UI in a list of implementations for cast_vote and read_vote, and finally to execute delete_poll with the API 140 set to preferential mode 142 with REST and database again added to a list of implementations for delete_poll. The API 140 may decide to execute create_poll with the REST implementation due to more robustness than the alternative database implementation, and because the command line implementation is not in the list of implementations for create_poll. On successfully creating the poll, the API 140 may then execute cast_vote and read_vote with the web UI implementation as the only available choice in strict mode 144. On either success or failure of cast_vote and read_vote, the API 140 may then decide to tear down the test and clean up by executing delete_poll with the database implementation because the REST implementation does not support delete_poll. In an example, the programmer may quickly test the REST implementation for cast_vote and read_vote by updating the test case to use REST as the only option for the list of implementations for cast_vote and read_vote.

Figure 4:
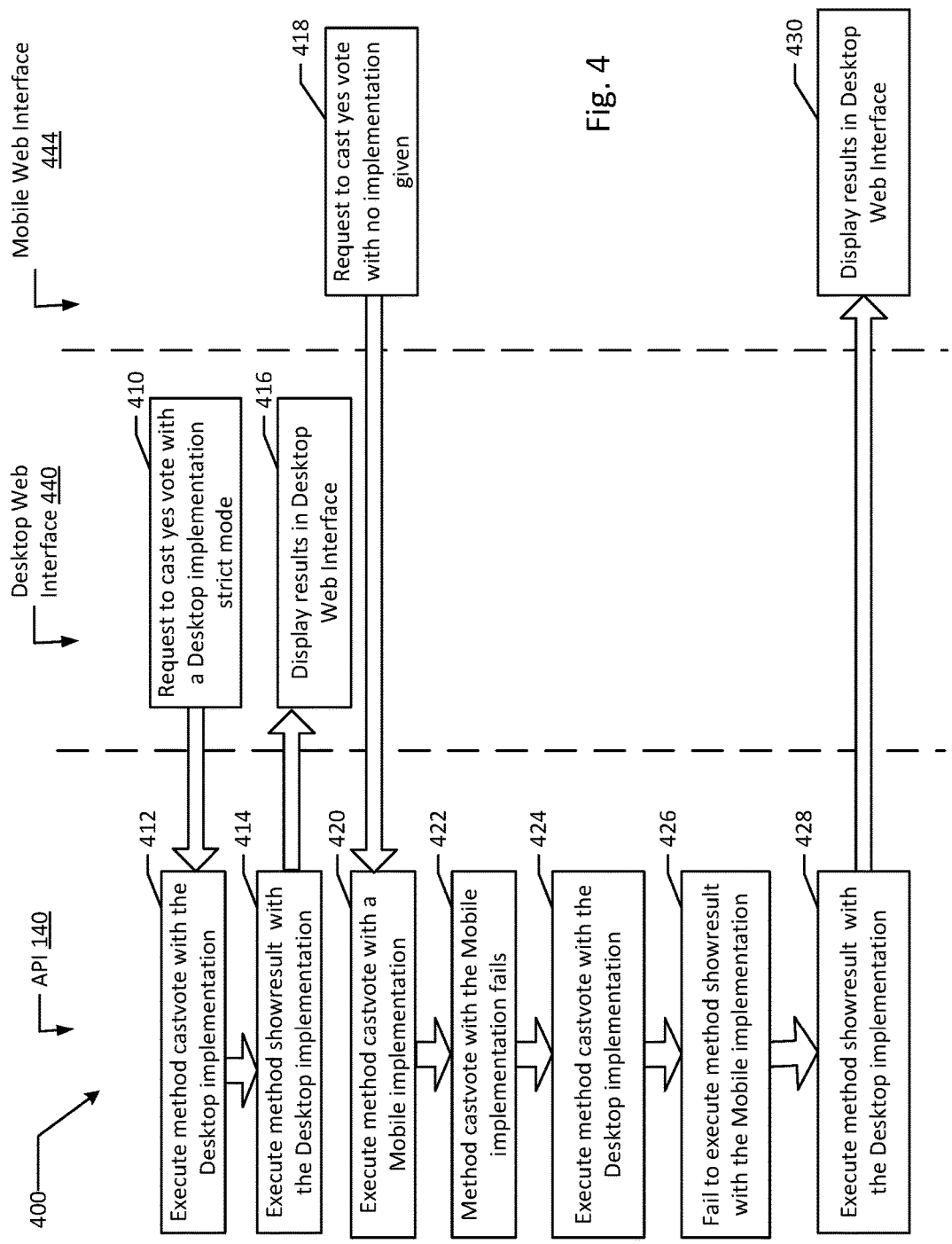
FIG. 4 is a flow diagram illustrating implementing multi-endpoint methods in a failover environment according to an example of the present disclosure.

FIG. 4 depicts a flow diagram illustrating implementing multi-endpoint methods in a failover environment according to an example of the present disclosure. Although the examples below are described with reference to the flowchart illustrated in FIG. 4, it will be appreciated that many other methods of performing the acts associated with FIG. 4 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 400, a desktop web interface 440 and a mobile web interface 444 are in communication API 140.

In an example system 400, API 140 allows for voting in a poll and showing results of the poll via method castvote and method showresult, each of which may be executed in either a desktop implementation or a mobile implementation. In the example, desktop web interface 440 may send a request to cast a yes vote with the desktop implementation with the API 140 set to strict mode 144 (block 410). In the example, API 140 may execute method castvote with the desktop implementation (block 412). In response to successfully executing castvote, the API 140 may execute method showresult with the desktop implementation (block 414). Upon successfully executing method showresult, the results of the poll may be displayed in desktop web interface 440 (block 416).

The API 140 may then receive a second request from mobile interface 444 to cast a yes vote with no implementation requested, therefore setting a list of implementations in API 140 to null (block 418). In response to the request, API 140 may determine that the request should be executed in preferential mode 142 rather than rejecting the request as deficient. The API 140 may attempt to execute method castvote with a mobile implementation as a mobile implementation may be determined to produce optimal results for viewing on a mobile web interface (block 420). In an example, method castvote with the mobile implementation fails (block 422). The API 140, operating in preferential mode 142, is configured to be able to select any implementation of the plurality of implementations for method castvote in the system, and may therefore select the alternative desktop implementation to execute method castvote (block 424). In an example, API 140 may be preconfigured with information regarding interfacing with many or all of the method-implementation combinations available for execution by API 140 in the system. In another example, the various implementations in the system may announce to API 140 the methods supported by the various implementations. Upon success of method castvote with the desktop implementation, the API 140 may attempt to execute method showresult with the mobile implementation to display the results of the poll seamlessly for the client using the mobile web interface 444, obfuscating the use of the desktop implementation as a backup implementation to cast the vote, but in an example, executing method showresult with the mobile implementation fails (block 426). In an example, the API 140 may then execute method showresult with the desktop implementation (block 428). The mobile web interface may then receive a success response from the API 140, but the client becomes aware of a possible issue because instead of the results appearing in the mobile web interface 444 formatted for a mobile screen, the client receives the results in the desktop web interface 440 in a format that, for example, does not properly fit on the screen of the mobile device (block 430). In an example, the mobile device or mobile web interface 444 may be configured to reinterpret the output from the desktop web interface 440 to hide the use of a backup system from a user.

In utilizing embodiments of the present disclosure, a system may be made more robust as only the API 140 needs to be configured with the possible implementations for each method that may be requested. In an example, the API 140 may be configured to recognize new methods and new implementations through requests to execute the new methods or updates to active context 146 including adding the new implementations to list of implementations 148. In another example, API 140 may be configured to discover new method-implementation combinations by querying or receiving updates from known implementations with the methods supported by the known implementations. In an example, the API 140 may enable users to create new endpoints and new implementations. In the example, the user may then request the API 140 to execute the first method, triggering a second method, and one of the first and the second method may use the new implementation while the other method uses a pre-existing implementation. For example, in a system for paying for a financial transaction, there may be existing implementations to pay via credit card or pay via debit card. An affiliated company may create a new implementation to pay via wire transfer. In an example, the new implementation may be added to the API 140 as a new option via an update to API 140 such as a configuration update or a release. In another example, the new implementation may be defined and added to a list of implementations in API 140 by a request, for example a request to execute a method to pay for a financial transaction. In an example, the affiliate company may then request to execute the method to pay for a financial transaction using the wire transfer implementation. In a further example, an third party may request to pay for a transaction without any knowledge of the wire transfer implementation, but the API 140 executing in preferential mode 142 may execute the method to pay for a financial transaction using the wire transfer implementation if the API 140 has sufficient information for the third party in the active context 146 with which to use the wire transfer implementation (e.g., bank account number, routing number). In an alternative example, implementations may be added to methods and used by the API 140 in preferential mode in response to requests even if the requestor does not know of the implementation because a returned result from API 140 to the requestor may be in an acceptable or predictable format. In an example, a user of a mobile website may have results returned via a text message upon failure to deliver results via the mobile interface if the API 140 has a text message implementation available and the initial request from the mobile website included the user's phone number in an update to the active context 146.

Figure 5:
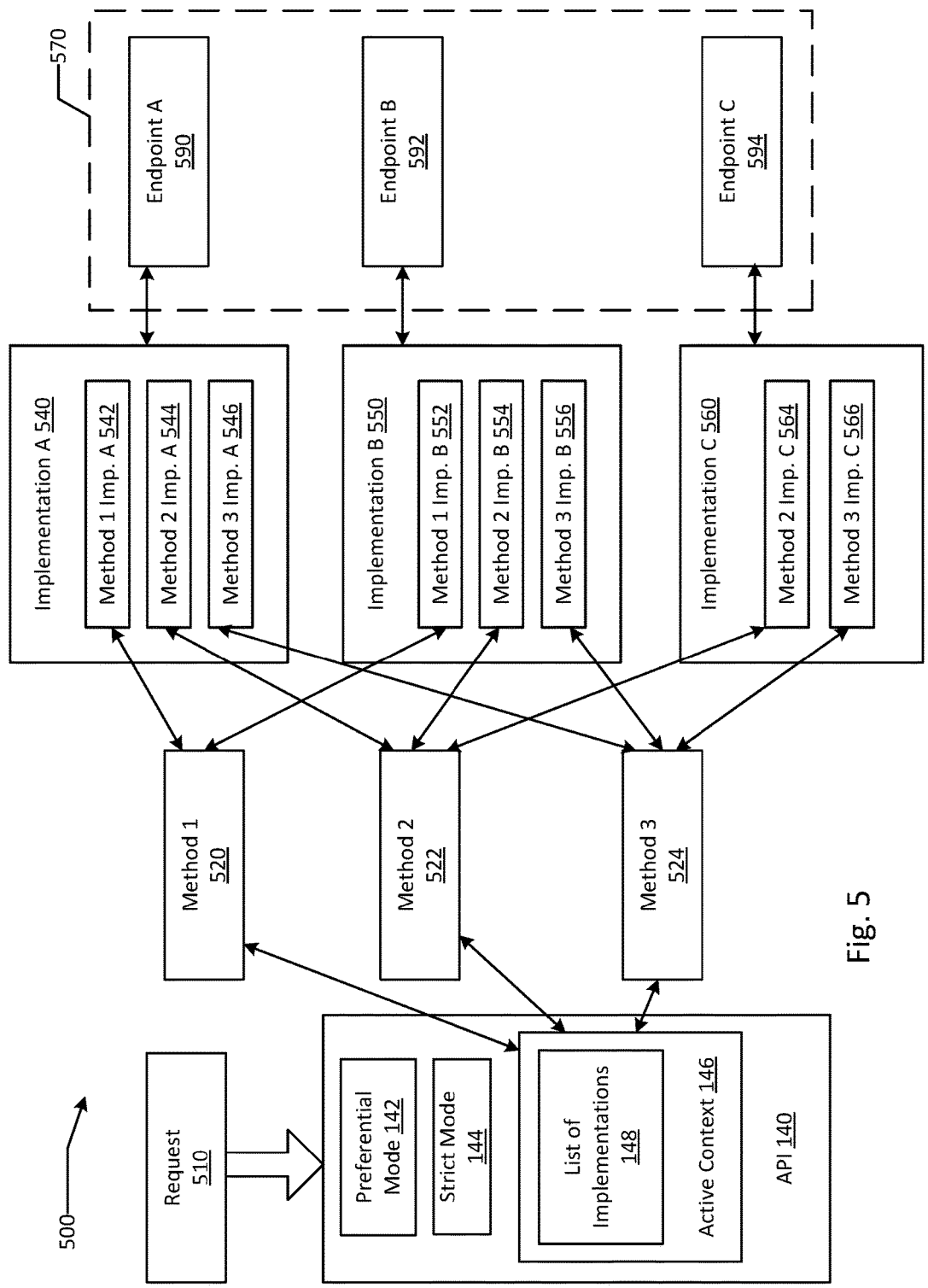
FIG. 5 is a block diagram illustrating an example embodiment of implementing multiple multi-endpoint methods according to an example of the present disclosure.

FIG. 5 depicts a block diagram illustrating an example embodiment of implementing multiple multi-endpoint methods according to an example of the present disclosure. Although the examples below are described with reference to the flowchart illustrated in FIG. 5, it will be appreciated that many other methods of performing the acts associated with FIG. 5 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 500, a request 510 is received by a hardware node running API 140. API 140 is running in either preferential mode 142 or strict mode 144, with an active context 146 including a list of implementations 148.

In an example, request 510 may be a request to execute method 520 in strict mode 144, method 522 in preferential mode 142 and method 524 in strict mode 144. In an example where only one list of implementations 148 is provided listing only implementation C 560, the request 510 would fail because implementation C 560 does not include an implementation of method 1 520, only implementations of method 2 implementation C 564 and method 3 implementation C 566. Therefore, in the example, endpoint C 594 is incapable of executing method 520, and API 140 does not have a valid choice of implementation for method 520 for request 510. In an alternative example, request 510 may succeed if the active context 146 is configured to allow the API 140 to switch to preferential mode 142 to execute a method in the event that a request 510 deficiently requests an impossible method-implementation combination in strict mode 142. In such an example, method 520 may be executed with implementation A 540 or implementation B 550 in the form of method 1 implementation A 542 or method 1 implementation B 550, the request being processed respectively by endpoint A 590 or endpoint B 592. In the example, method 522 is executed in preferential mode 142, and may therefore execute with any implementation that is determined by API 140 to be preferential, including method 2 implementation A 544, method 2 implementation B 554, or method 2 implementation C 564. However, executing in strict mode 144 again for method 524, the API 140 may not select method 3 implementation A 546 or method 3 implementation B 556 because method 3 implementation C 566 is a valid method-implementation combination, and as a result, request 510's request to execute method 524 would be processed by endpoint C 594. In an example, all three endpoints 590, 592 and 594 may be located on one physical device or within one local area network 570.

In alternative embodiments, upon failure to execute any method of methods 520, 522 and 524, API 140 may select an alternative implementation of the failed method to reattempt execution. In an example, after processing a request, an endpoint (e.g., 590, 592, 594) returns a response through the implementation used (e.g., 540, 550, 560) to the respective method (e.g., 520, 522, 524) to be formatted in a uniform way for API 140. In such a system, processing a request with any endpoint (e.g., 590, 592, and 594) may result in the same response to the requestor, making the user experience of the requestor seamless. For example, a request 510 may be a request to make a payment, endpoint A 590 being a connection to a credit card processor, endpoint B 592 being a connection to a debit card processor, and endpoint C 594 being a connection to a bank for wire transfers. In an example, request 510 may be a request to API 140 to make a payment without specifying how the payment will be made, and operating in preferential mode 142, the API 140 may process the payment with a credit card implementation 540. Implementation A 540 may translate a method call for method 522 from a request to make payment to a string of payment details and account numbers acceptable to the credit card processor endpoint A 590. Implementation A 540 may then translate the response from endpoint A 590 of a successful payment into a success message that is acceptable to method 522, which may in turn notify API 140 of its success. In an example, method 522 may notify API 140 of success or failure in the same manner regardless of the implementation of method 522 used for processing a request. API 140 may then respond to request 510 notifying the requestor that payment has been made without being required to give details as to how the payment was made. In another example, a requestor may request that payment be made via debit card, and therefore API 140 running in strict mode 144 may execute method 522 with implementation B 550 and endpoint B 592 may process the request, passing a success notice up the chain through implementation B 550, method 522 and API 140 to the requestor that a payment has been made successfully specifically using a debit card transaction. In an example, the API 140 may always report which implementation of a given method was used in processing a request.

In an example of the present disclosure regarding data retrieval, data may be stored by a system with different levels of availability, for example, data may be in RAM for fast retrieval and usage, on a hard disk for daily use, in a cloud storage online for routine backups, and written to tape stored in a warehouse for long term archiving. A request to an API to retrieve data stored by the system in the preferential mode may default to retrieving the data through the implementation to access the RAM due to, for example, faster retrieval times or more recent data. Alternatively, a request may be made to robotically retrieve the relevant tape in storage and to upload the requested data to a user if, for example, a specific version of the data from a specific historical date is requested that is no longer present in any of the more current storage formats.

In another example, in a system generating computer generated imagery (CGI) models, a system may be asked to perform certain mesh operations with an API executing in preferential mode. In such a system, the active context may have access to historical data detailing the likelihood of success of different implementations based on basic input parameters included in a request to execute a method for generating a mesh operation.

Figure 6:
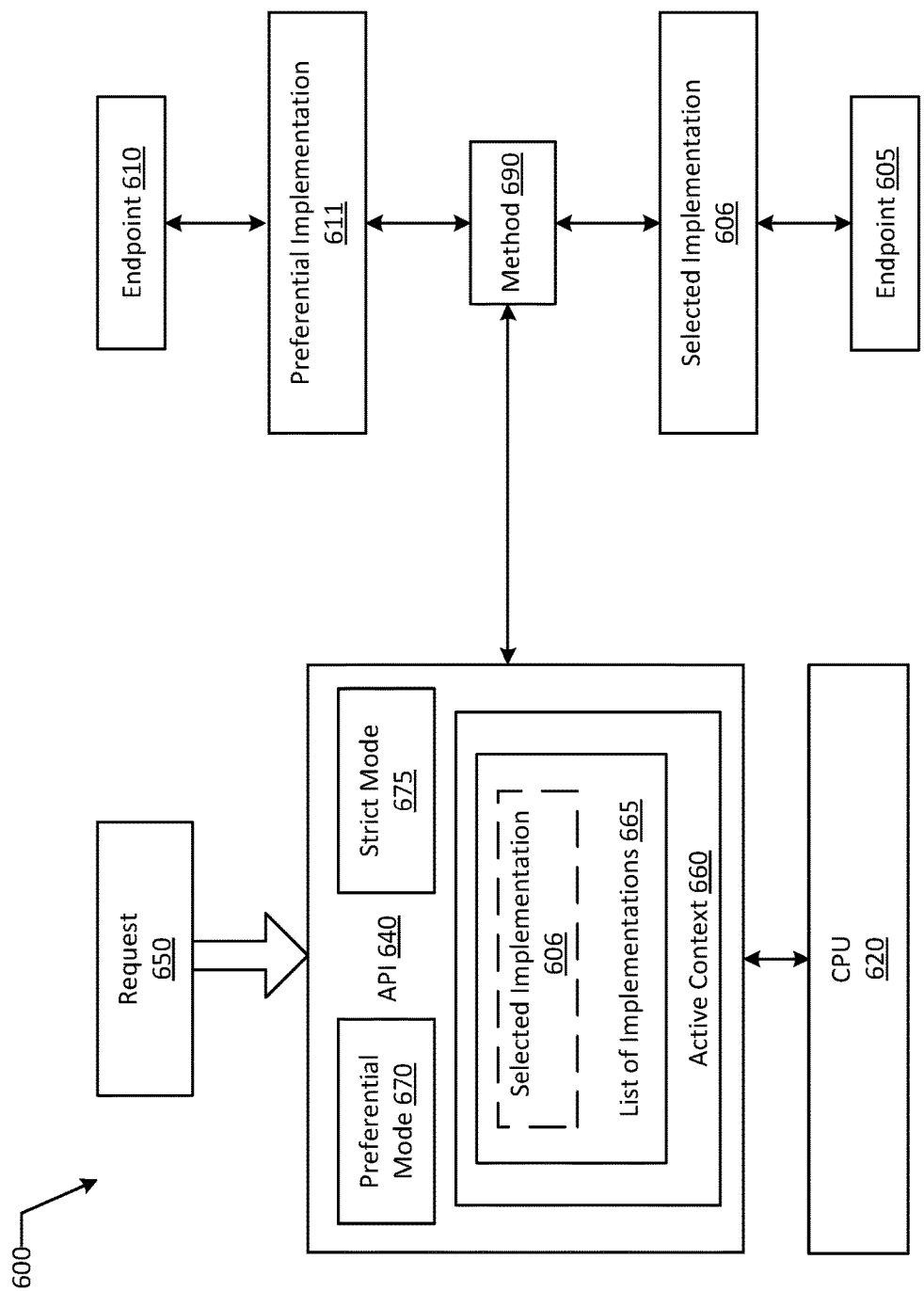
FIG. 6 is a block diagram of an example system implementing multi-endpoint methods according to an example of the present disclosure.

FIG. 6 depicts a block diagram of an example system implementing multi-endpoint methods according to an example of the present disclosure. Example system 600 comprises a plurality of endpoints (e.g., endpoints 605 and 610) associated with a respective plurality of implementations (e.g., implementations 606 and 611), including a first endpoint 605 and a first implementation 606. In the example, an API 640 is executing on CPU 620. The API 640 receives a request 650 to execute method 690. The API 640 processes the request 650 with active context 660, the active context 660 including a list of implementations 665. In some examples, the active context 660 and the list of implementations 665 may be dynamically updated by information included within request 650. In an example, the active context 660 and the list of implementations 665 may have default values in the event request 650 does not include contextual information. In an example, the request 650 updates the list of implementations 665 to include one implementation 606 of the plurality of implementations.

It is determined that API 640 is executing in either a preferential mode 670 or a strict mode 675. Execution in preferential mode 670 enables the API 640 to select a preferential implementation from the plurality of implementations to execute a particular method. In an example, API 640 may select implementation 611 as the preferential implementation, and preferential implementation 611 may be selected based on a variety of criteria including but not limited to the list of implementations 665, speed of execution, attributes associated with the first method 690, a preference list, an availability of respective implementations, historical usage, and a random distribution. Execution in strict mode 675 requires that the API 640 select an implementation from the list of implementations 665. In an example, the API 640 selects implementation 606 as the selected implementation, because it is the only implementation in the list of implementations 665. Responsive to determining that the API 640 is executing in strict mode 675, implementation 606 may be selected as the selected implementation from the list of implementations 665 in the active context 660, and the API 640 may execute method 690 with the selected implementation 606. Alternatively, responsive to determining that the API 640 is executing in preferential mode 670, implementation 611 may be selected from the plurality of implementations as the preferential implementation, and the API 640 may execute method 690 with the preferential implementation 611. Upon execution of method 690 with either the selected implementation 606 or the preferential implementation 611, the request 650 is processed by either endpoint 605 or endpoint 610 depending on whether the selected implementation 606 or the preferential implementation 611 is used to execute method 690.

It will be appreciated that all of the disclosed methods and procedures described herein may be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications may be made without departing from the spirit and scope of the present subject matter and without diminishing its intended advantages. It is therefore intended that such changes and modifications be covered by the appended claims.

The invention is claimed as follows:

1. A system comprising:
   a plurality of endpoints associated with a respective plurality of implementations, wherein the plurality of endpoints includes at least a first endpoint associated with a first implementation;
   one or more processors;
   an application programming interface executing on the one or more processors to:
   receive a first request to execute a first method;
   process, by the application programming interface, the first request with an active context, wherein the active context includes at least a list of implementations, the list of implementations including at least one implementation of the plurality of implementations;
   determine that the application programming interface is executing in one of a preferential mode and a strict mode, the execution of the application programming interface in the preferential mode enabling the application programming interface to select a preferential implementation of the plurality of implementations to execute a particular method, and the execution of the application programming interface in the strict mode requiring that the application programming interface execute the particular method with a selected implementation selected from the list of implementations, wherein responsive to determining that:
the application programming interface is executing in the strict mode, select the first implementation as the selected implementation from the list of implementations in the active context and execute the first method with the selected implementation;
the application programming interface is executing in the preferential mode, execute the first method with the preferential implementation, the preferential implementation being selected from the plurality of implementations; and
process the first request with one of the first endpoint and an endpoint associated with the preferential implementation.

2. The system of claim 1, wherein the application programming interface executing in the strict mode selects an implementation other than the first implementation from the list of implementations as the selected implementation in response to one of a second request to execute the first method and a third request to execute a second method.

3. The system of claim 1, wherein the list of implementations in the active context has no valid implementation for executing the first method; and
the application programming interface executing in the strict mode one of (i) returns an error and (ii) switches to the preferential mode to execute the first method in preferential mode.

4. The system of claim 1, wherein the list of implementations includes one of, zero implementations, one implementation, and a second plurality of implementations.

5. The system of claim 1, wherein the preferential implementation selected by the application programming interface executing in the preferential mode is an implementation in the list of implementations.

6. The system of claim 1, wherein the active context has a plurality of lists of implementations respectively associated with different methods, wherein at least one list of the plurality of lists of implementations included in the active context is set in response to the first request.

7. The system of claim 6, wherein executing the first method invokes a second method, and the application programming interface selects an implementation with which to execute the second method from a different list of implementations than the list of implementations used for the first method.

8. The system of claim 6, wherein the application programming interface executes a second method in a same mode as the first method.

9. The system of claim 6, wherein the application programming interface executes the first method in the preferential mode using a second implementation, and executes a second method in the strict mode using the first implementation.

10. The system of claim 1, wherein a second request to execute the first method fails to include information to set the list of implementations, and the application programming interface one of (i) rejects the second request with an error and (ii) executes the second request in the preferential mode by selecting an implementation from the plurality of implementations.

11. The system of claim 1, wherein the application programming interface executing in the preferential mode selects the preferential implementation to execute the first method based on at least one of, the list of implementations, speed of execution, attributes associated with the first method, a preference list, an availability of respective implementations, historical usage, and a random distribution.

12. The system of claim 1, wherein the application programming interface upon failure to execute the first method, reports a failure to execute the first method and successfully executes the first method with a different implementation from the plurality of implementations.

13. The system of claim 1, wherein the execution of the first method succeeds with the application programming interface executing in the preferential mode and fails with the application programming interface executing in the strict mode.

14. The system of claim 1, further comprising a second request to execute the first method and a third implementation, wherein the first method cannot be executed with the third implementation.

15. The system of claim 14, wherein the application programming interface executing in the strict mode responds to the second request to execute the first method by executing the first method with the first implementation and the first method invokes a second method executed by the application programming interface with the third implementation.

16. The system of claim 14, wherein the application programming interface executes one of the first method and a second method with the first implementation; and
executes one of the first method and the second method with a new implementation.

17. The system of claim 1, wherein the application programming interface enables users to create new endpoints and new implementations, and a second request is made to the application programming interface to execute the first method.

18. A method comprising:
receiving, by an application programming interface, a first request to execute a first method;
processing, by the application programming interface, the first request wherein the application programming interface has an active context, the active context including at least a list of implementations, the list of implementations including at least one implementation of a plurality of implementations, the plurality of implementations being associated with a respective plurality of endpoints including at least a first endpoint associated with a first implementation;
determining that the application programming interface is executing in one of a preferential mode and a strict mode, wherein the application programming interface executing in the preferential mode enables the application programming interface to select a preferential implementation of the plurality of implementations to execute a particular method, and the execution of the application programming interface in the strict mode requires that the application programming interface execute the particular method with a selected implementation selected from the list of implementations, wherein responsive to determining that:
the application programming interface is executing in the strict mode, select the first implementation as the selected implementation from the list of implementations in the active context and execute the first method with the selected first implementation;
the application programming interface is executing in the preferential mode, execute the first method with the preferential implementation, the preferential implementation being selected from the plurality of implementations; and processing the first request with one of the first endpoint and an endpoint associated with the preferential implementation.

19. The method of claim 18, wherein executing the first method invokes a second method and the application programming interface executes the second method in one of a same mode as the first method and a different mode from the first method.

20. A non-transitory computer-readable storage medium storing executable instructions which, when executed by a computer system, cause the computer system to:
receive by an application programming interface, a first request to execute a first method;
process, by the application programming interface, the first request wherein the application programming interface has an active context, the active context including at least a list of implementations, the list of implementations including at least one implementation of a plurality of implementations, the plurality of implementations being associated with a respective plurality of endpoints including at least a first endpoint associated with a first implementation;
determine that the application programming interface is executing in one of a preferential mode and a strict mode, wherein the application programming interface executing in the preferential mode enables the application programming interface to select a preferential implementation of the plurality of implementations to execute a particular method, and the execution of the application programming interface in the strict mode requires that the application programming interface execute the particular method with a selected implementation selected from the list of implementations, wherein responsive to determining that:
the application programming interface is executing in the strict mode, select the first implementation as the selected implementation from the list of implementations in the active context and execute the first method with the selected first implementation;
the application programming interface is executing in the preferential mode, execute the first method with the preferential implementation, the preferential implementation being selected from the plurality of implementations; and
process the first request with one of the first endpoint and an endpoint associated with the preferential implementation.

\* \* \* \* \*